United States Patent
Andresen et al.

(10) Patent No.: US 6,174,446 B1
(45) Date of Patent: Jan. 16, 2001

(54) VACUUM FILTER APPARATUS AND METHOD FOR RECOVERING CONTAMINATED LIQUID

(75) Inventors: Erik J. Andresen, 30 Grove St., Wayland, MA (US) 01778; Christopher C. Ashley, Lincoln, MA (US)

(73) Assignee: Erik J. Andresen, Wayland, MA (US)

(*) Notice: Under 35 U.S.C. 154(b), the term of this patent shall be extended for 0 days.

(21) Appl. No.: 09/274,577

(22) Filed: Mar. 23, 1999

(51) Int. Cl.[7] .................... C02F 11/12; B01D 33/00
(52) U.S. Cl. ............. 210/744; 210/783; 210/800; 210/803; 210/387; 210/401; 210/406; 210/416.1
(58) Field of Search .................. 210/387–400, 210/401, 406, 416.1–416.5, 744–783, 791, 800–803

(56) References Cited

U.S. PATENT DOCUMENTS

| | | | |
|---|---|---|---|
| 3,618,722 | 11/1971 | Dietrick | 210/104 |
| 3,970,536 | 7/1976 | Shettel | 204/180 |
| 4,062,780 | 12/1977 | Estabrook | 210/401 |
| 4,192,747 | 3/1980 | Wykoff | 210/83 |
| 4,343,701 | 8/1982 | Parshall | 210/387 |
| 4,394,272 | 7/1983 | Damerau | 210/779 |
| 4,396,505 | 8/1983 | Willson et al. | 210/97 |
| 4,396,506 | 8/1983 | Damerau | 210/107 |
| 4,427,543 | 1/1984 | Frick et al. | 210/143 |
| 4,481,108 | 11/1984 | Bratten | 210/137 |
| 4,514,301 | 4/1985 | Parshall | 210/400 |
| 4,571,302 | 2/1986 | Willson | 210/791 |
| 4,661,251 | 4/1987 | Wykoff | 210/396 |
| 4,673,502 | 6/1987 | Fox | 210/413 |
| 4,693,836 | 9/1987 | Willson | 210/791 |
| 4,715,964 | 12/1987 | Harms | 210/783 |
| 4,751,006 | 6/1988 | Becker | 210/774 |
| 4,761,226 | 8/1988 | Creps | 210/106 |
| 4,774,010 | 9/1988 | Bratten | 210/791 |
| 4,865,724 | 9/1989 | Brandt et al. | 210/104 |
| 5,008,007 | 4/1991 | Anderson | 210/111 |
| 5,112,485 | 5/1992 | Hirs | 210/387 |
| 5,221,468 | 6/1993 | Fox et al. | 210/97 |
| 5,221,469 | 6/1993 | Nehls | 210/232 |
| 5,256,290 | 10/1993 | Becker et al. | 210/400 |
| 5,330,648 | 7/1994 | Benschoter et al. | 210/387 |
| 5,338,443 | 8/1994 | McEwen | 210/91 |
| 5,344,556 | 9/1994 | McEwen et al. | 210/91 |
| 5,366,626 | 11/1994 | Pierson | 210/216 |
| 5,417,849 | 5/1995 | McEwen et al. | 210/109 |
| 5,601,729 | 2/1997 | Bratten | 210/783 |
| 5,624,579 | 4/1997 | Bratten | 210/783 |
| 5,961,847 | * 10/1999 | Creps et al. | 210/783 |

OTHER PUBLICATIONS

Joseph, J.J., "Coolant Filtration," Joseph Printing, pp. 38–41, Jan. 1985.

Hydromation company, "Hydro–Vac™ Vacuum filtration systems," product brochure, 1984.

Hydromation company, "Mini–Vac™ Vacuum filtration systems," Product bochure, 1984.

Filtertech, "Model LA; A proven concept in flat bed filtration, Filtervac," Product brochure, pp. 1–6.

* cited by examiner

Primary Examiner—David A. Simmons
Assistant Examiner—Betsey Morrison Hoey
(74) Attorney, Agent, or Firm—Foley, Hoag & Eliot LLP; W. Hugo Liepmann

(57) ABSTRACT

A filter system employs a pressure differential to draw liquid from a first liquid vessel through a filter media to a filtered liquid chamber. A pressure assembly generates a reduced pressure in the chamber. One embodiment of the filtration apparatus includes a liquid vessel above a filtered liquid chamber. A laterally extending fluid-pervious support forms a septum between the liquid vessel and the filtered liquid chamber. The support can be a perforate plate and supports filter media. The apparatus includes a wheel element mounted in spaced relation to the perforate plate and at least a portion of which is located in the vessel. An indexing mechanism, illustratively employing a pneumatic actuator selectively rotates the wheel element for indexing the media.

22 Claims, 7 Drawing Sheets

VACUUM FILTER APPARATUS AND METHOD FOR RECOVERING CONTAMINATED LIQUID

BACKGROUND

This invention concerns a vacuum filter system for removing solids such as grit and particles from contaminated liquids such as machine tool coolants and other process liquids. The invention also provides corresponding methods.

Replacing and disposing of contaminated process liquids such as machine tool coolants can be costly. Hence, those who use such liquids often seek to reuse them after they become contaminated. Many such contaminated liquids require filtration prior to reuse.

The prior practice of using settling ponds to recondition contaminated liquids presents an undesirable environmental problem, among others.

Prior filtering equipment for conditioning contaminated liquids includes batch filter systems that typically employ individual filter units, e.g. cartridges or bag filter elements, that require periodic maintenance and/or replacement. Such batch systems are ill suited to continuous-production environments.

In contrast, continuous filter systems employ bulk filter media, typically in roll form. Such bulk filter media has a large amount of contiguous filter material, only a portion of which is disposed to filter contaminated liquid at a given time. Bulk filter media systems are available in at least three basic types, namely pressure systems, vacuum systems, and gravity systems.

Pressure filter systems have various sealing assemblies to seal the filter media against a sealing structure. Such sealing assemblies contain the liquid within the filter itself and inhibit contaminants from entering the filtered liquid section. These pressure filter systems can provide high differential pressure, typically in the order of 2,100 grams per square centimeter ($g/cm^2$) or more, across the media, and consequently can provide good filtration. However, the sealing arrangement adds cost and complexity.

Vacuum filter systems can provide moderate differential pressure, e.g., 350 $g/cm^2$, across the filter media for good filtration for a given filter area and flow rate. For example, filter areas of 0.5 to 3 square meters and flow rates of 100 to 450 liters per minute per square meter of filter area are common. Vacuum filters can provide reliable automatic operation in demanding environments. As is the case with pressure filters, vacuum filter systems commonly interrupt the liquid flow across the media to advance the filter media.

In gravity filter systems, an input pool of contaminated liquid rests on a filter media. A belt or chain, often mesh-like, supports and advances the filter media. The liquid flows through the media in a manner similar to coffee flowing through a coffee filter, and filtered liquid collects in a filtered liquid tank below the filter media. As the filter media becomes loaded with contaminants, the liquid level rises in the contaminated liquid tank, signaling the need to advance the media and the belt. Typically the depth of liquid in the input pool is in the order of 10 centimeters. A small depth of liquid in the input pool yields a low differential pressure across the media, e.g., usually less than 35 $g/cm^2$. While gravity filters are relatively simple and inexpensive, they require a large filtration area or a less restrictive filter media, compared to pressure and vacuum filter systems, in order to achieve the same flow rate. However, a less restrictive filter media compromises filtration effectiveness. In addition, gravity filters provide modest contaminant loading per square foot and a high rate of media consumption relative to pressure systems and to vacuum filter systems. A high rate of media consumption in a filter system adds to the expense and maintenance requirements of the filter system. One example of a gravity filter is disclosed in U.S. Pat. No. 5,221,468 issued to Fox et al., and incorporated herein by reference.

A feature common to many of the above described filter systems is a liquid entry port for receiving contaminated liquid from a machine tool. Most machine tools have their work surface at a height that accommodates the operator. The machine tool then discharges contaminated liquid below the work surface, at anywhere from 15 to 100 centimeters above the floor. Thus, if the liquid entry port height of a filter system is above the discharge from the machine tool, e.g., 100 centimeters or higher, a pump is needed to transfer the contaminated liquid to the filter. Such a pump adds to the cost of the filter system.

Electrical controls and electromechanical devices are another feature common to many prior filter systems. These controls and devices typically include an electric motor, a starter, a gear reducer drive, overload protection, and an electric float switch, all of which must meet rigid industrial electrical specifications.

Thus, a need exists for an inexpensive, simple, and effective filter system that has minimal environmental impact.

More particularly, a need exists for a filter system that meets the following criteria: low capital cost; effective filtration, i.e., filtration that removes a large majority of the contaminants from the contaminated liquid; minimal maintenance and operator intervention; modest space requirements; adequate liquid capacity; adequate liquid flow and pressure; long filter media life and modest media cost; and a simple interface with devices that use process liquids, e.g., machine tools.

Thus, it is an object of the invention to provide an effective filter system that is inexpensive and easy to maintain.

It is another object of the invention to provide a filter system that has modest space requirements and operates without the need for a pump to transfer liquid from a machine tool to the filter system.

It is another object of the invention to provide a filter system of the character described above that does not require extensive electrical controls.

Other objects of the invention will in part be obvious and will in part appear hereinafter.

SUMMARY OF THE INVENTION

One preferred embodiment of a filter system according to this invention includes a contaminated liquid reservoir separated from a filtered liquid chamber by a laterally extending fluid-pervious support, e.g., a perforate plate. The perforate plate, or septum, supports a filter media that filters contaminated liquid from the contaminated liquid reservoir. In one preferred embodiment, the filter media is a non-woven, substantially continuous web, and can be disposable. The filter media preferably is selected from those commercially available and in typically a rolled sheet or web, although in principle other sheet configurations, e.g. fan-folded, can be used.

The apparatus uses an eductor or other pumping device to develop a pressure differential between the contaminated liquid reservoir and the filtered liquid chamber. The pressure differential drives contaminated liquid present in the contaminated liquid reservoir through the filter media and into the filtered liquid chamber. An eductor is deemed a preferred pressure source, e.g. suction generator. It is a structurally and operationally simple device for recovering fluids in liquid and/or gas state.

In one preferred practice, the liquid reservoir for contaminated liquid is at atmospheric pressure. The eductor generates a sub-atmospheric pressure in the filtered liquid chamber to develop the desired pressure differential between the two containment compartments.

A media tractor engages the filter media to advance it selectively along the perforate plate. The movement, in at least one practice, is intermittent and occurs when no pressure differential other than gravitational is imposed between the reservoir of contaminated liquid and the chamber of filtered liquid.

A system of pneumatic controls senses when the media is becoming clogged with filtrate, and hence is to be advanced. The control system stops the imposed pressure differential and allows the pressure across the media to equilibrate before actuating the media tractor to advance the filter media, and hence to bring a selected length of fresh media into operative position on the perforate plate.

One preferred media tractor employs an endless conveyor mechanism to advance the filter media. The conveyor mechanism, in addition and optionally, can engage filtrate collected on the media, and ensure that it advances, with the media, to a discharge. This operation prevents collected filtrate from flowing, due either to gravity and/or liquid flow, to a less clogged portion of the filter media. The conveyor mechanism of the illustrated media tractor employs a wheel element, preferably in the form of a generally cylindrical open-walled drum skeletal roller and having a pair of axially-spaced rims. The wheel element has a horizontal axis and is mounted above the perforate septum plate, which is arcuate to conform with the cylindrical form of the wheel element. The wheel rims pass closely above the plate and engage the upper surface of the filter media as it passes over the plate. The wheel rims thus hold the media in place on the perforate plate.

The advancing movement of the filter media is facilitated by a pair of endless conveyor belts. Each belt has a flight that passes below the same length of filter media that one wheel rim engages. With this preferred conveyor structure, the filter media, as it passes through the liquid being processed and over the perforate plate, is engaged in each of two side-by-side compressive nips, each formed between one belt and one wheel rim.

Advancing the conveyor system, for example by rotating the wheel element, moves the filter media forward, as desired for advance. The conveyor belts advance a corresponding amount, to facilitate the advancing movement of the filter media. The driven rotation of the wheel element can readily provide the force for advancing the conveyor belts.

Alternatively, the conveyor belts can be driven, either together with the wheel element or without driving the wheel element, to power the media advance operation. It is deemed preferable, however, to drive only the wheel structure and allow that force to be transferred to advance the conveyor belts.

A preferred wheel element according to the invention has optional slats, arranged like circumferentially-spaced paddles, extending axially between the rims. These slats rest on, or are in close proximity to, the filter media on the septum plate, to further ensure the position of the filter media. In addition, the slats move with the advance of the media to ensure that collected filtrate moves to discharge with the media, rather than wash or flow back to fresher, more active sections of the media.

In further accord with the practice of the invention, the drive mechanism for powering the foregoing media tractor, and one preferred practice of the invention, employs an indexing mechanism that simply advances the conveyor mechanism for incremental advance of the filter media. In one practice, the index assembly employs a pneumatic actuator that is coupled by a pawl-like mechanism with the wheel element of the media tractor.

An optional feature of the invention mounts the rotational axis of the media advancing wheel element with a resilient bias. The resilient, biased mount allows vertical movement of the shaft on which the wheel element rotates, and maintains a resilient downward pressure on the wheel element to enhance the frictional and sealing engagement of the wheel rims against the media, as the media passes over the perforate plate. The allowable vertical movement of the wheel element, against the action of the resilient bias, allows the wheel element to lift as needed, and thereby allow large solids to collect with the filtrate and move along the filter media without jamming the filtration apparatus.

In one embodiment, the filtration apparatus includes a liquid-level sensing element for determining when the level of liquid in the contaminated liquid reservoir is above a predetermined level; this occurs when the active section of the filter media is clogged and hence when the filter media needs to be incremented to bring a fresh section into operation. The liquid-level sensing element responds to the liquid level in the contaminated liquid reservoir, and actuates the circulating media tractor when the liquid level rises above a predetermined level. The control system for the filtration apparatus optionally includes a time delay element. The time delay element causes the control system to wait a predetermined time, after the re-initiation of filtration following an advance of the filter media, before initiating a subsequent advance.

The filtration apparatus according to one preferred embodiment of the invention includes an exit ramp element, having a proximal end and a distal end, for guiding the discharge of the contaminated filter media and for draining liquid from the contaminated media prior to discharge of the media. The proximal end is coupled to the downstream end of the perforate plate. The exit ramp element supports the media while the media exits the apparatus. The exit ramp element can include troughs or like laterally extending channels, to facilitate the draining of liquid from the filter media and back to the reservoir of unfiltered liquid.

Another feature of filtration apparatus according to the invention is the provision of a set of one or more supports for the septum. The supports enable the septum to maintain a desired shape and position even when it is subjected to a substantial compressive load. The septum support structure allows filtered liquid to pass readily to the eductor or other discharge.

The septum supports are preferably secured to the septum, and the sub-assembly is configured to fit and seat in a bottom pan. The septum and support sub-assembly can be removably installed, to facilitate the removal of accumulated sediment from the chamber of filtered liquid.

In one preferred embodiment of the filtration apparatus of the invention, the media tractor includes a set of conveyor belts and a discharge and pinch roller assembly, for moving and guiding the filter media. The conveyor belt assembly engages the surface of the filter media opposite from the wheel element, and holds the media in place and advances the media. The belt assembly in addition transmits drive force from the wheel element to the roller assembly. The roller assembly is coupled to the distal end of the exit ramp element and guides the filter media as the media leaves the exit ramp and drops into a receptacle. The roller assembly preferably includes a set of pinch rollers, that pinches the conveyor belt and the filter media with the discharge roller assembly.

In a preferred embodiment of the invention, the filtration apparatus includes a tank located proximal to the filtered liquid chamber for receiving the filtered liquid. Filtered liquid is discharged from the chamber to the filtered liquid tank. The differential pressure generator, for developing a selected pressure differential that moves liquid in the reservoir through the filter media and hence to the chamber, can include a suction connection element and a discharge connection element for venting the filtered liquid chamber to atmosphere, for providing a rapid sub-atmospheric pressure break in the filtered liquid chamber. The rapid sub-atmospheric pressure break facilitates rapid indexing of the filter media.

In a preferred embodiment of the filtration apparatus, the entry port, which accepts contaminated liquid from a machine tool or other device, is located at a relatively low height. The incoming contaminated liquid is generally fed by gravity to the entry port, and the entry port typically is located less than approximately 90 cm and as low as 15 cm above the floor or other surface on which the apparatus rests. Another feature is a liquid distributor that receives the incoming contaminated liquid, and distributes it along a lateral width dimension of the filter apparatus. According to one embodiment of the invention, the filtered liquid chamber has a volume of less than two cubic centimeters per square centimeter of filter area.

It is also an optional feature of the invention that the filtration apparatus includes a liquid distributor for distributing contaminated liquid across the filter media as the filter media enters the contaminated liquid reservoir. A preferred distributor suspends from the flight wheel shaft, for ease of assembly and cleansing.

Further optional features of the invention include liquid collecting elements, such as a drag out conveyor, a collection trough, and a screw conveyor for interfacing with a processing device such as a machine tool. The collection elements collect contaminated liquid from the device. For one practice, a collection trough is coupled to the contaminated liquid vessel so that contaminated liquid in the collection trough overflows into the contaminated liquid vessel. The screw conveyor transports large contaminants and chips to the dragout conveyor for discharge.

These and other features of the invention are more fully set forth below with reference to the following detailed description and the accompanying drawings.

The invention accordingly comprises the several steps in the relation of one or more of such steps with respect to each of the others, and the apparatus embodying features of construction, combinations of elements and arrangement of parts which are adapted to effect such steps, all as exemplified in the following detailed disclosure, and the scope of the invention is indicated in the claims.

BRIEF DESCRIPTION OF THE DRAWINGS

For a fuller understanding of the nature and objects of the invention, reference may be had to the following detailed description, taken in connection with the accompanying drawings, in which:

FIG. 9b is a front view along line 9b–9b of FIG. 9a; and

FIG. 9c is an end view along line 9c—9c of FIG. 9a.

DESCRIPTION OF THE ILLUSTRATED EMBODIMENTS

Figure 1:
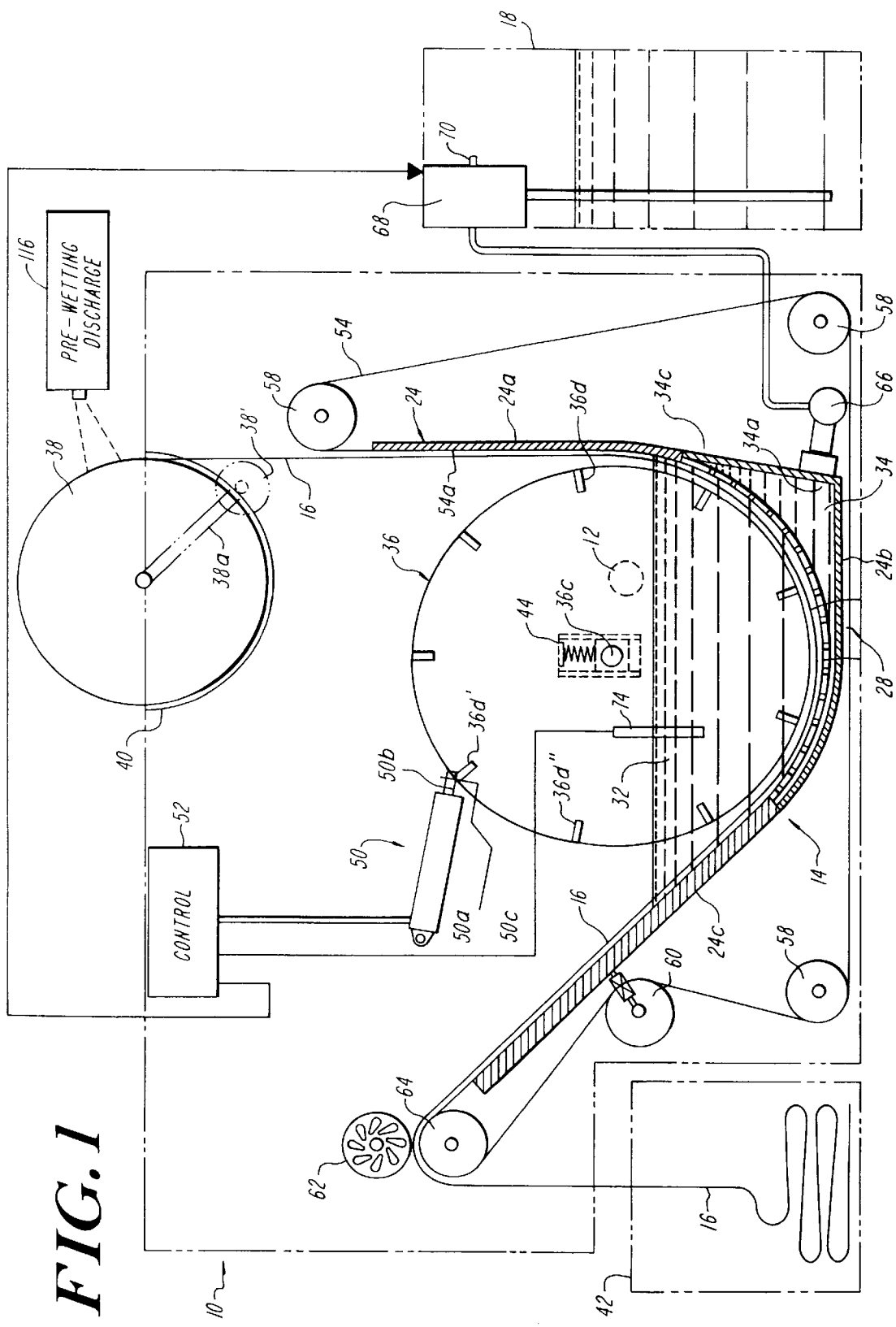
FIG. 1 is a partially schematic side elevation view of one embodiment of a vacuum filter system according to the invention, with a media indexing mechanism in retracted position.
Figure 2:
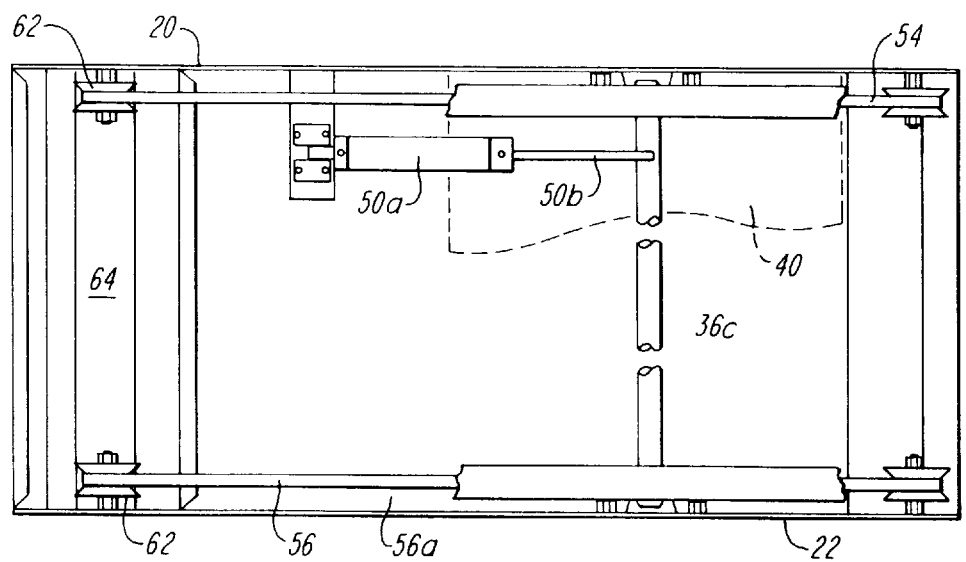
FIG. 2 is a simplified top plan view of the filter system of FIG. 1A.
Figure 3:
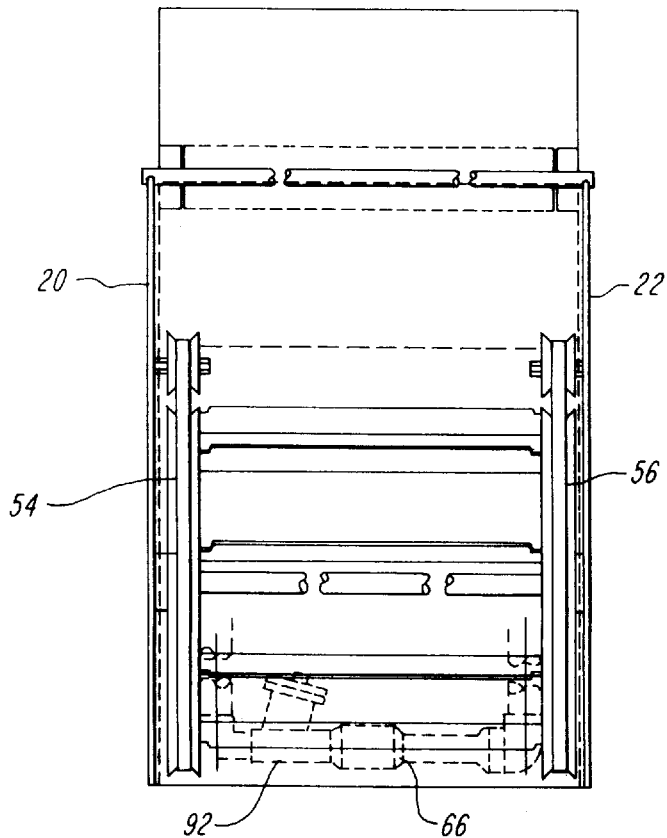
FIG. 3 is a simplified elevation end view of the system of FIG. 1, as viewed from the right in FIG. 1.

With reference to FIGS. 1, 2, and 3, a filtration system 10 according to the invention receives, at an input port 12, contaminated liquid such as machine tool coolant. The system processes the liquid in a liquids container 14 by passing the liquid through a web or sheet-like filter media 16, and discharges processed liquid, ready for reuse, to a storage tank 18.

The illustrated system employs a welded structure fabricated with a pair of spaced sidewalls or panels 20 and 22 and a pan 24, to form the reservoir 32 and the structural frame for the machine. The walls and pan typically are of sheet metal, e.g. stainless steel. The illustrated pan 24 has a steep rear wall 24a, to the right in FIG. 1, a generally horizontal bottom wall 24b, and a sloped, frontal discharge ramp wall 24c, to the left in FIG. 1.

Figure 4:
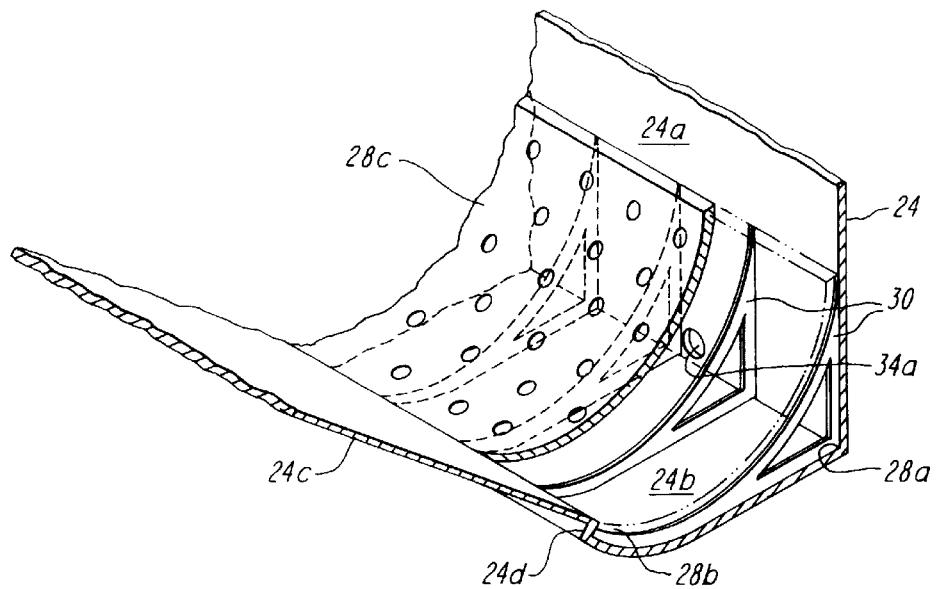
FIG. 4 is a fragmentary perspective view, partly broken away, of liquid containment structure and of the septum and septum support for the filter system of FIG. 1.

As shown in FIGS. 1 and 4, a perforated plate 28, supported on a set of plate-like supports 30, seats on the bottom of the pan nested between the front and rear walls. The plate 28 forms a septum that separates the volume of the container 14 to define a reservoir 32, disposed above the septum plate 28, for receiving and containing contaminated liquid to be processed, and a chamber 34, disposed below the septum, for receiving filtered liquid. The illustrated perforated plate 28, e.g. of steel, is welded to the set of spaced upright supports 30. The assembly of the septum plate and the support plates removably and replaceably seats within the pan 24, for ease of assembly and for cleaning. The septum supports 30 are apperttured or otherwise have large cutouts to facilitate liquid flow within the chamber 34.

Further, as shown in FIG. 4, the illustrated septum assembly has a generally triangular configuration, in the plane of FIG. 1, with a heel 28a of generally right angle, that seats in a corresponding bend in the pan 24. A toe 28b of the septum-support assembly nestingly seats behind a step 24d in the pan front wall. This configuration of the assembled septum plate and supports, and its seating in the pan 24, maintains the septum plate 28 securely in place.

With further reference to FIGS. 1 and 4, the perforated septum plate 28 has a surface 28c with a cylindrical contour, i.e. roundly curved, in the span thereof between the front and back walls of the pan 24, to conform to the periphery of a wheel element 36, mounted above it.

Figure 5:
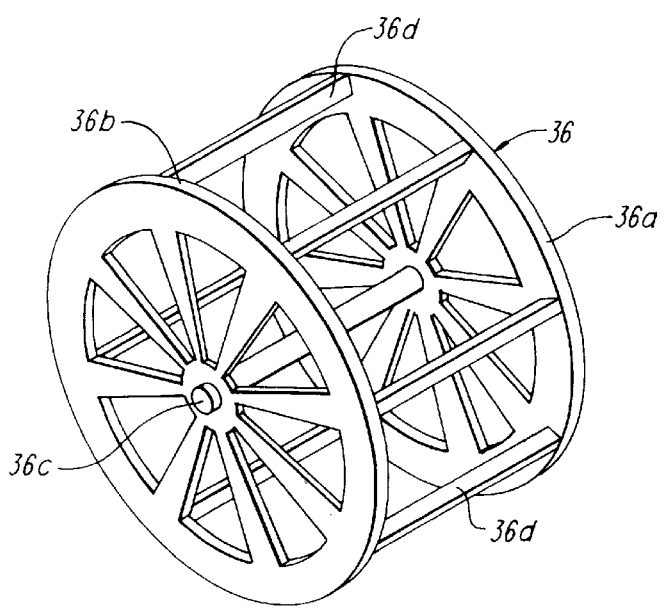
FIG. 5 is a perspective view of a wheeled conveyor structure for the filter system of FIG. 1.

As appears in FIGS. 1 and 5, a drive mechanism for advancing the media 16 in the apparatus 10 employs the wheel element 36 to engage the upper surface of the filter media 16 as the media passes over the septum. The media 16 is illustrated as supplied from a roll 38 that is seated between the walls 22 and 24. A roll support 40 secured to the walls 20 and 22 can employ a roller or a trough, from which the roller unspools to feed out media. The path of the media 16 from the support 40, as appears in FIG. 1, is essentially vertically down along the pan wall 24a, over the cylindrically curved surface of the perforate plate 28, over the ramp-like front wall 24c, and then into a discharge receptacle 42, shown at the left in FIG. 1.

The media roll 38 preferably has a central axial shaft, the ends of which are seated in guides forming slots 38a (FIG. 1) that maintain the vertical tangent to the roll, along which the media unwraps from the roll to feed down to the septum, essentially at the fixed location shown in FIG. 1, as the roll diminishes in size with 38' consumption of media. The filter media can be selected from known materials conventional in the art.

With reference to FIG. 5, the illustrated wheel element 36 is skeletal, with a pair of axially spaced circular rims 36a and 36b secured on an axis 36c for rotation together. The rims mount a set of circumferentially-spaced, axially-extending paddles 36d. Each paddle 36d, also termed a flight bar, is free for limited radial movement, for example, as by mounting it in slots in the rims 36a and 36b. With this available radial movement, each paddle 36d can engage and rest on the media 16 when the paddle is lowermost, e.g. when it is passing over the septum 28. Further, each paddle has limited freedom relative to the others and to the rims for radial inward movement. The wheel element walls that form the rims 36a and 36b are apperturred for the free passage of liquid. The illustrated wheel element 36 can then be viewed as a roller of skeletal structure.

Figure 6:
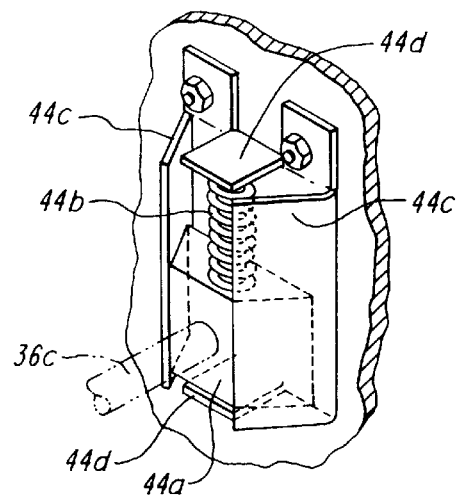
FIG. 6 is a fragmentary perspective view of resiliently biased mounting for the rotation axis of the wheel structure of FIG. 5.

As shown in FIGS. 1 and 5, the wheel element 36 fits between the walls 20 and 22, and is disposed above the septum 28. A pair of spring loaded resiliently adjustable bearings 44, 44, secured to the walls 20 and 22, mounts the wheel structure shaft for this disposition. As appears in FIG. 6, each bearing assembly 44 includes a bearing block 44a vertically biased downward by a spring 44b. The bearing block is constrained vertically extending between side guides 44c, for substantially vertical movement between upper and lower limits by end guides 44d.

With reference to FIGS. 1 and 2, the illustrated filter apparatus employs a pneumatic actuator 50 to rotate the wheel element 36 incrementally and thereby to advance fresh filter media to the perforate plate 28, and correspondingly to move spent media and filtrate it carries for discharge in the waste receptacle 42. The illustrated actuator 50 operates with a pawl action, and employs a linear pneumatic actuator having a cylinder 50a and piston 50b on which is mounted a guiding actuator 50c. The base of the cylinder 50a is hingedly mounted to the wall 20, by way of a bracket, for rotation about a horizontal axis parallel to the shaft 36c. The guiding actuator 50c, secured on the piston 50b to reciprocate with it when the cylinder 50a is actuated, is an elongated member extending longitudinally to the piston 50b. The illustrated guiding actuator 50c has a nose portion to abut and press against the side of a paddle 36d of the wheel element, as appears in FIG. 1A. It further has a ramp portion configured to engage and be lifted by the next successive wheel paddle 36d as the wheel element rotates. This guiding action of a wheel paddle 36d against the actuator 50c maintains the actuator nose engaged with one wheel element paddle, as appears in FIG. 1A.

Figure 1A:
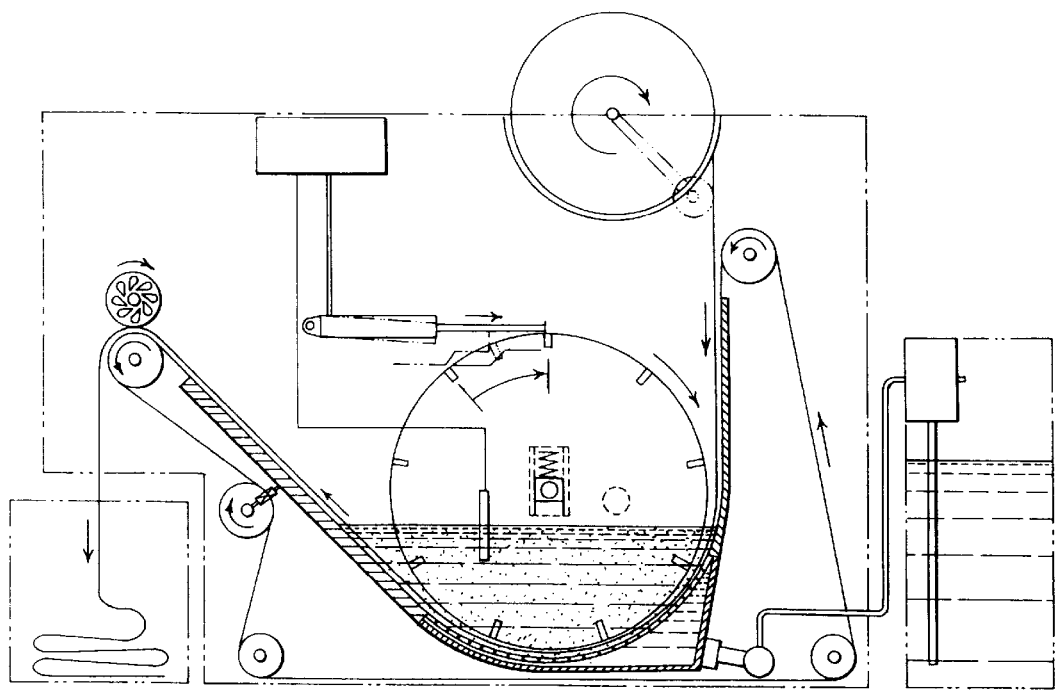
FIG. 1A is a view similar to FIG. 1 with the media indexing mechanism in an extended position.

More particularly, when the actuator 50 is retracted and the wheel element is rotationally at rest, as appears in FIG. 1, the piston 50b is withdrawn into the cylinder 50a and the actuator nose is at rest adjacent a paddle 36d. When the actuator is driven, the piston 50b is driven outward from the cylinder toward the position shown in FIGS. 1a and 2. During this outward travel of the piston 50b, the guiding actuator pushes against the one wheel paddle 36d with which it is engaged, and thereby rotates the wheel structure incrementally, e.g. in the clockwise direction in FIG. 1A. As the point of engagement between the guiding actuator 50c and the wheel paddle 36d' rotates about the horizontal axis of shaft 36c, the actuator piston 50a rotates counterclockwise from the position shown in FIG. 1 to the position shown in FIG. 1a. The next circumferentially successive wheel paddle 36d" rotates clockwise and hence upward, coming in close proximity to or abatement with the lower surface of the guiding actuator. Throughout this motion, the nose of the guiding actuator remains in abutment against one wheel paddle 36d', as FIG. 1A shows. Upon completion of this one stroke of the actuator piston 50b, the piston retracts back to the position shown in FIG. 1. During this retracting motion, the guiding actuator 50c slides backward, e.g. to the left in FIG. 1A, until it returns to the rest position shown in FIG. 1. The guiding actuator typically rests on a wheel paddle, e.g. on the paddle 50d" in FIG. 1A, during this retracting movement. In the retracted rest position, the nose of the actuator is positioned against the next circumferentially successive wheel paddle 36d", ready to commence another incremental rotation of the wheel element 36.

A control unit 52 shown in FIG. 1 and connected with the actuator mechanism 50 controls and schedules the foregoing rotation of the wheel element, as discussed further below.

The illustrated filter apparatus 10 further has a second conveyor subsystem formed with a pair of belts 54 and 56, to enhance and facilitate the advance of the filter media 16 when the wheel element 36 is rotated as described above. Each endless belt 54, 56 is adjacent one wall 20, 22 as appears in FIGS. 2 and 3, so that an active flight 54a, 56a of each belt is aligned with and arranged to bear against one wheel rim 36a, 36b, respectively. The active flight 54a and 56a of each belt extends within the container 14 and successively traverses along the pan back wall 24a and across the perforate plate 28 and along the pan front wall 24c. The return flight of each belt extends outward of the container 14 and is supported on idler rollers 58 and a tension roller 60. One pair of idler rollers 58 is adjacent the entry of the belt active flights into the reservoir, i.e. is disposed above the pan back wall 24a as appears in FIG. 1, and hence is adjacent the initial engagement of a belt with the filter media 14. A discharge idler roller 64 on which each belt is trained is beyond the pan front wall 24c. The latter roller preferably is a cylindrical roller that extends across and engages the full width of the filter media 16, see FIGS. 1 and 2. The discharge roller 64 cooperates with a pair of pinch rollers 62, each of which compressively engages one belt 54 and 56. Each belt 54, 56 is arranged with the active flight 54*a*, 56*a* thereof disposed adjacent the side of the filter media opposite from the wheel element 36. Thus, with reference to FIG. 1, the belt active flight 54*a* is disposed relatively behind and/or below the filter media throughout its traverse along the pan back wall 24*a* and across the perforate plate 28 and along the pan forward wall 24*c*. Thus, each belt 54, 56 wraps around one rim 36*a*, 36*b*, respectively, of the wheel element essentially throughout the traverse of the belt over the perforate plate 28, and the filter media is compressively engaged between the wheel rims and the belts.

With this arrangement of the belts 54 and 56, the incremental rotation of the wheel element 36 is imparted by the wheel rims to the belts, and advances the two belts a corresponding amount, with the advancing filter media engaged between the belts and the wheel rims.

A further powered element of the illustrated filter apparatus 10 is a pressure source that maintains the pressure in the chamber 34, which receives filtered liquid selectively below the atmospheric pressure in the reservoir 32. The illustrated pressure source is an eductor 66 that operates in conjunction with a pump 68. The eductor is coupled with the fluid outlet port 34*a* from the chamber 34. That port which illustratively apertures the pan back wall 34*c*, is located low, near bottom height on the system 10.

The pump 68 powers the eductor 66 to draw fluid from the chamber 34, and discharges the fluid from a discharge 70 to the filtered liquid tank 18. The filtered liquid in the tank 18 is ready for reuse, for example as machine tool coolant and/or lubricant. The pump discharge port 70 is, as illustrated, located above the filtered liquid in the tank 18 to prevent filtered liquid from draining back into the filtering apparatus reservoir from the tank 18. Thus, the location of the discharge port 70 prevents flooding of the vessel 32 of the filtering apparatus, in the event the filter system shuts down. The location of the discharge 70 also removes the potential for an upward hydrostatic pressure on the filter media 16. Such an upward hydrostatic pressure could displace the media from seating on the belts 54 and 56 and on the perforate plate 28.

Figure 7:
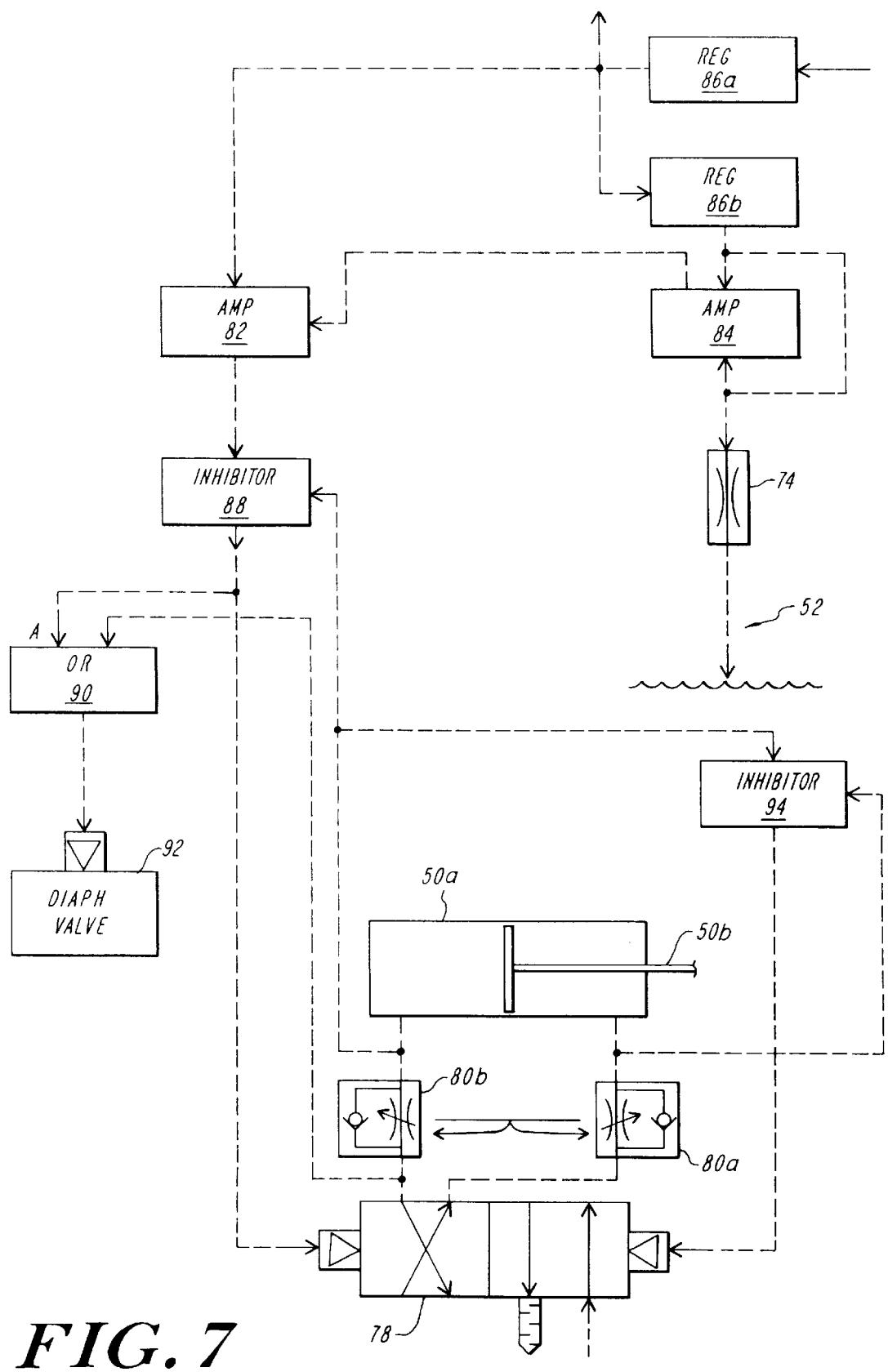
FIG. 7 is a schematic representation of one pneumatic control system for the filter system of FIG. 1.
Figure 8:
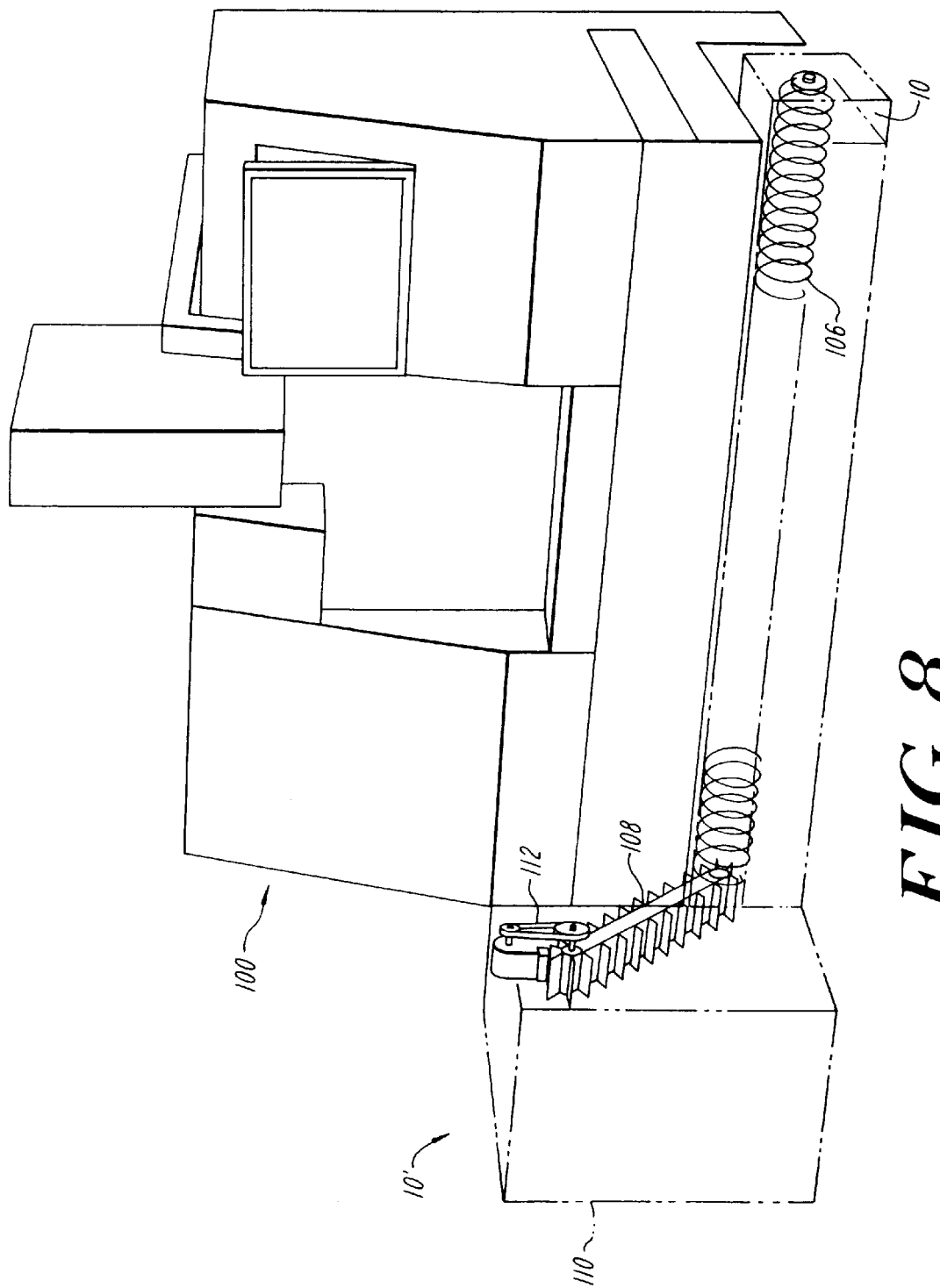
FIG. 8 is a perspective view of a liquid processing system according to the invention.

With reference to FIGS. 1 and 7, and according to the illustrated preferred embodiment of the invention, the illustrated pneumatic control unit 52 of the filtration apparatus 10, receives input information from a liquid level sensing element 74 and controls the operation of the pneumatic actuator 50. The level sensor 74 is typically mounted by way of one wall 20, 22 to sense when the liquid in the container 14, and particularly in the reservoir 32, is above a selected upper level. The sensor is connected with the control unit 52.

In operation of the filtration apparatus, in the filtering mode, the filter media 16 is stationary on the perforate plate 28. The build up of filtered matter on the filter media 16 increases the filter media's resistance to the flow of liquid. As the resistance to flow increases, the amount of liquid flowing out of the reservoir 32 of contaminated liquid and the liquid level there correspondingly rises, assuming a generally uniform input flow rate.

When the liquid level sensing element 74 determines that the liquid level is above a predetermined level, the control unit 52 responds to the resultant signal from the sensing element 74 to initiate a regeneration cycle, as follows. The control unit 52 shuts off the motive flow from the pump 68 to the eductor 66. Thus, the eductor 66 stops generating a sub-atmospheric pressure in the filtered liquid chamber 34, and the pressure across the filter media 16 equalizes.

With the pressure equalized, the control unit 52 drives the actuator 50 to advance the filter media. Reciprocating the actuator 50 rotates the wheel element 36 by a selected movement, which advances the conveyor belts 54 and 56 correspondingly. These movements index a selected short length of new media 16, approximately fifteen centimeters in one illustrative embodiment. Indexing a short length of filter media relative to the total length of the perforate plate allows most of the contaminated media, including dirt cake, to remain on the perforate plate to assist in efficient filtration. The wheel element 36 and the conveyor belts 54 and 56 discharge a corresponding length of contaminated media from the upper distal end of the pan surface 24*c*. The control unit 52 further actuates the filtration system 10 to restore eductor motive flow, and filtration resumes. Fresh media allows a greater flow of liquid. Thus, as a consequence of indexing the filter media, the level of the contaminated liquid in the reservoir 32 of contaminated liquid gradually drops, again assuming uniform input flow. In addition, because the filtration apparatus indexes a short length of filter media relative to the length of the exit ramp formed by the pan surface 24*c*, the contaminated media 16 rests on the ramp surface 24*c* through several regeneration cycles and liquid drains from it into the reservoir 32. As a result, the contaminated media is well drained when discharged into receptacle 42.

If the liquid level sensing element 74 determines that the liquid level in the reservoir 32 has fallen below a predetermined minimal level, the pneumatic control unit 52 shuts a valve 78 (FIG. 7), which stops the operation of the pneumatic actuator 50. The actuator 50 does not operate again until the liquid level rises above the predetermined maximal level. The illustrated pneumatic control unit 52 preferably operates entirely by air and include a pilot-air actuated valve 78, and flow control valves 80*a*, 80*b*, which are discussed in more detail subsequently. Those skilled in the art will appreciate that the invention can be practiced with hydraulic controls, or with other control elements and sequences.

In one preferred practice of the invention, the pneumatic control unit 52, the actuator 50, and the liquid-level sensing element 74 also constitute a time delay assembly. The time delay assembly imposes a minimum time interval, e.g. delay time, between responding to level-responsive signals from the sensing element. As a result, the liquid-level sensing element 74 effectively is shut off for a predetermined time after the filtration apparatus 10 indexes the media 16. Once the predetermined time elapses, the control unit 52 again responds to the sensing of the liquid level by the sensing element 74.

Using air, in contrast to electricity, for operation of the actuator 50 and the liquid-level sensing element 74 and the control unit 52 reduces the cost of the filtration apparatus. The pneumatic elements eliminate such conventional electrical control elements as an electric motor, a starter, a gear reducer drive, overload protection, and an electric float switch, all of which typically must meet rigid industrial electrical specifications.

FIGS. 1 and 7 illustrate one arrangement of the pneumatic control unit 52 for the pneumatic actuator 50. Amplifiers 82 and 84 recieve gas, preferably air, through filter regulators 86*a*, 86*b*. Filter regulator 86*b* supplies low pressure air, e.g. 630 g/cm$^2$, to the input and control orifices of the amplifier 84 and, through a fixed orifice to an open bleed tube in the sensing element 74. The filter regulator 86*b* also supplies air at higher pressure, e.g., 5,600 g/cm², to the amplifier 82 and to the air pilot actuated valve 78. The valve 78 supplies air to the actuator cylinder 50*a* selectively, through one of two flow control valves 80*a*, 80*b*, either to the rod end of the cylinder 50*a* to retract the piston, or to the blind end of the cylinder to extend the piston.

In operation, with the actuator 50 stopped, the piston rod 50*b* is fully retracted relative to the pneumatic cylinder 50*a*. As the filtering media 16 plugs with contaminants, the liquid level in the reservoir 32 rises. At a predetermined level, the liquid covers the end of the open bleed tube of the sensing element 74, causing an increase in pressure at the control orifice of amplifier 84. In response, the amplifier 84 supplies selected output air pressure to the amplifier 82, which in turn supplies full pressure from the filter regulator 86*b* to an inhibitor element 88.

While there is not a pressure input from the blind end of pneumatic cylinder 50*a*, inhibitor element 88 supplies air to a logical "Or" element 90, which in turn supplies air o the normally-open diaphragm valve 92. This supply of air closes the valve 92, which stops the motive flow to the eductor 66. The inhibitor element 88 also supplies a pilot sort on valve 78. The valve 78 then supplies air to the blind end of the pneumatic cylinder 50*a*, which extends the piston rod 50*b*. FIG. 1*a* shows this condition. The valve 78 also supplies air to the "Or" element 90. At the same time, the flow control 80*b*supplies air pressure to the inhibitor elements 88 and 94.

The inhibitor element 88 responds to the input pressure level and shuts off the air supplied to the logical "Or" element 90 and to the pilot port on the valve 78. The air supplied to the blind end of the pneumatic cylinder 50*a* also maintains the closed condition of the normally open diaphragm valve 92 by way of the "Or" element 90. The pneumatic cylinder maintains the closed condition of the valve 92 until the piston rod 50*b* is fully extended. The closed condition of valve 92 maintains a pressure break, i.e. maintains atmospheric pressure, in the filtered liquid chamber 34 via eductor 66, during the time the actuator 50 is extending the piston 50*b*.

The flow control valve 80*a* has a check valve and an adjustable flow restrictor. The air trapped in the rod end of the pneumatic cylinder 50*a*, by the flow control valve 80*a*, maintains a control pressure on the inhibitor element 94. The control pressure on inhibitor element 94 prevents the air supplied to the blind end of the pneumatic cylinder 50*a* from actuating the pilot valve 78. As the piston rod 50*b* reaches its full extension, it bleeds off air trapped in the rod end of the pneumatic cylinder 5*a*. As the air trapped in the rod end of the pneumatic cylinder bleeds off, the control pressure in inhibitor element 94 falls until the air supplied to the blind end of the pneumatic cylinder is no longer blocked from actuating the other pilot port of valve 78. When the air supplied to the blind end of the pneumatic cylinder actuates the other pilot port of valve 78, it changes the air supply to the rod end of the pneumatic cylinder 50*a*.

At this point, the pneumatic control unit 52 has fully extended the piston rod 50*b* and the filter system has indexed a new portion of filter media 16 into active placement on the apertured plate 28. The pneumatic control unit 52 no longer supplies air to the normally open diaphragm valve 92. As a consequence, the valve 92 opens, permitting motive flow to the eductor 66, and the filtration resumes. Hence, as a result of indexing the media 16, the filtration resumes at a maximal rate, and the liquid level in the reservoir 32 of contaminated liquid consequently starts to drop.

The flow control valve 80*b* restricts the air in the blind end of the pneumatic cylinder. The illustrated flow control valve 80*b* contains a check valve and an adjustable flow restricter. Restricting the air in the blind end of cylinder 50*a* provides a control pressure for the inhibitor element 88, which blocks the output air. The adjustable flow restrictor in flow control 80*b* permits the gradual bleed down of air on the blind end of pneumatic cylinder 50*a* for providing a time delay on the return piston rod 50*b* stroke.

As the piston rod 50*a* reaches the end of its return stroke, i.e. to the condition shown in FIG. 1, the control pressure to the inhibitor element 88 falls, permitting air supplied by amplifier 82 to repeat the cycle. If the level of the contaminated liquid falls below the end of the open bleed tube of the sensing element 74, the cycle stops.

Components for the foregoing practice of the invention are available from numerous suppliers. For example, one can obtain many of the pneumatic controls from Applied Industrial Technologies in Avon, Mass., diaphragm valves from Flow Elements in Chelmsford, Mass., and an eductor from Clark Reliance Corporation in Strongville, Ohio.

From the above, it will be seen that both the circulating media tractor for the filtration apparatus and the controls can be entirely pneumatically operated. Pneumatic operation results in a substantial cost saving. Pneumatic controls also reduce and simplify maintenance of the vacuum filter apparatus 10.

One goal of efficient vacuum filtration apparatus is a relatively small filtered liquid chamber 34. Such a filtered liquid chamber 34 of relatively small volume allows for rapid pressure equalization across the media 16. Rapid pressure equalization across the media facilitates rapid indexing of the media 16, which in turn results in filtration apparatus with a relatively high average flow rate per square centimeter of filter media.

However, one consequence of a relatively small filtered liquid chamber 34 is that the working liquid level in the chamber 34 may fall below the uppermost portions of the septum 28. Thus, it is possible that at times air at atmospheric pressure is drawn into the differential pressure assembly, which creates a sub-atmospheric or negative pressure in the filtered liquid chamber 34.

In contrast to a centrifugal pump, the eductor 66 does not lose suction when drawing in air. In other words, the eductor 66 can intake both liquids and gases. Thus, the deployment of an eductor in filtering apparatus according to the invention permits the use of a more compact filtered liquid chamber 34 and filter septum 28. Typical vacuum filters utilize a flat septum panel and require infeed and outfeed radius plates, which generally result in a longer unit for a given filter area. Also, many require a sufficient depth of contaminated liquid to prevent air from being drawn into the vacuum chamber. Typical vacuum filters have relatively high liquid entry heights and have required a transfer pump element.

Figure 1B:
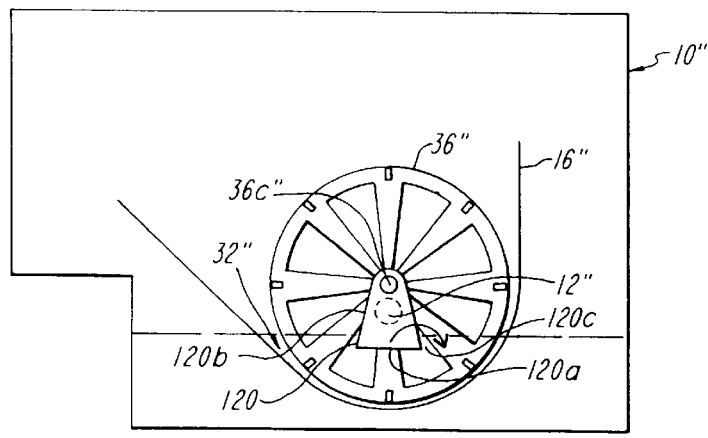
FIG. 1B is a view similar to FIG. 1 of a further embodiment of a filter system according to the invention and which incorporates a liquid distributor.

FIG. 1B shows that a filtration system 10" according to the invention can have a fluid distributor 120, to distribute incoming liquid across the width of the filter media 16". The illustrated fluid distributor has a trough 120*a* that is suspended by a hanger bracket 120*b*, from the rotation shaft 36*c"* of the wheel element 36".

The liquid inlet port 12" of the system 10" is located directly below the wheel shaft 36*c"*. It hence directs incoming liquid between the lowermost two adjacent spokes of the wheel element 36" and onto the distributor trough 120*a*.

The distributor trough 120*a* has a lip or rim 120*c* at a selected generally horizontally extending height and over which incoming liquid spills into the reservoir 32". This spill rim 120c is preferably on one side only of the distributor, i.e. on the right side in FIG. 1B, to discharge incoming liquid onto the portion of the filter media 16" that just entered the reservoir 32" and hence that has just commenced advancing across the septum 28".

Such a fluid distributor 120 can be fabricated readily from a single piece of sheet stock and can readily be installed by suspending it from the wheel element shaft, and correspondingly readily removed for a cleaning or other servicing of the filtration system.

FIGS. 8 and 9a–c show a liquid reprocessing system 100 employing filtration apparatus 10' according to the invention, and embodying features of FIGS. 1–7, installed with an industrial machine tool 102. A collection trough 104 is disposed under at least a portion of the machine tool 106 to receive and collect coolant and other process liquids from the machine tool 102 and to receive, for example, metal chips and other debris that the machine tool discharges. A screw conveyor 106, mounted for rotation in the trough 104, moves contaminants, chips, and other large debris along the trough to a dragout conveyor 108 communicating with one end of the trough. The dragout conveyor lifts solid debris out of the tough 104 and discharges it to a waste hopper 110. The illustrated conveyors 108 and 106 are commonly powered by a motor 112 coupled by a belt and sprocket to drive one end of the belt-like dragout conveyor 108. The screw conveyor 106 is coupled to be driven from the dragout conveyor, as shown.

Figure 9A:
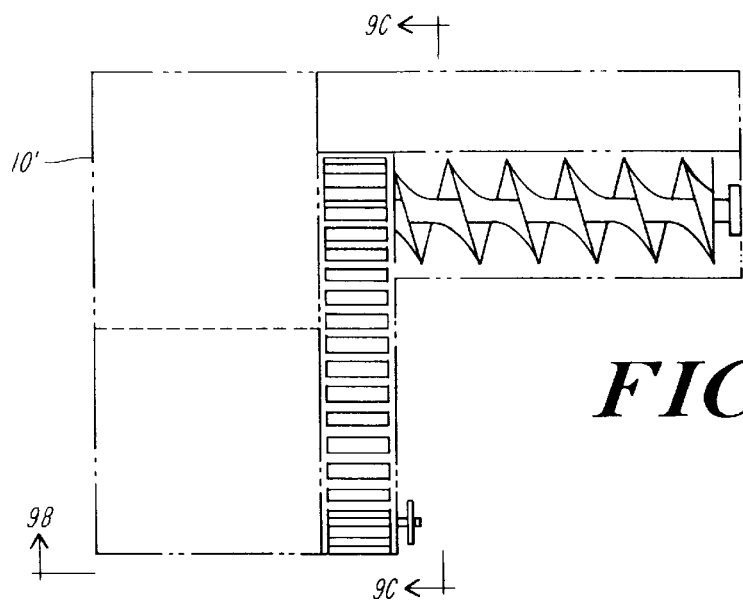
FIG. 9a is a schematic top view of the filter system of FIG. 1 arranged for operation with a screw conveyor and dragout conveyor.
Figure 9B:
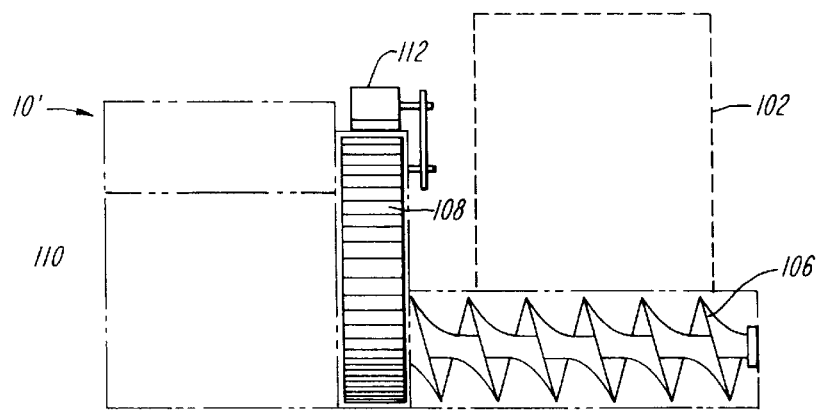
Figure 9C:
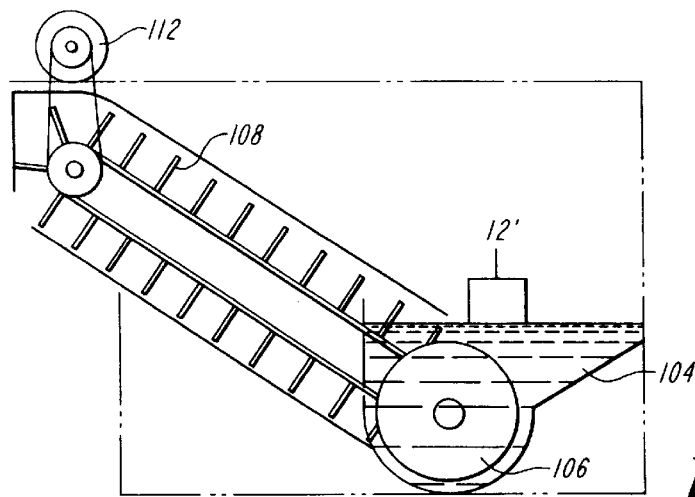

With further reference to FIGS. 8 and 9a–c, coolant and other liquid that collects in the trough 104 overflows directly into the container 14 (FIG. 1) of the filtration apparatus 10', typically by way of the inlet port 12', FIG. 9c. The arrangement illustrated for the liquid processing system 100, for recovering coolant and other liquids from the machine tool 102, is applicable for the collection and filtration of coolants and other liquids from a variety of machining and like tools, which typically have low, e.g. less than 30 cm high, coolant collection pans beneath and adjacent to a work zone. The filtration apparatus 10' of the invention receives the contaminated liquid without use of any pumping element and processes it, with simple power input, for continuous online reuse by the machine tool.

The invention can also be practiced with filtration apparatus 10, such as shown in FIGS. 1–7, that optionally includes a device for wetting filter media prior to introducing it to the container of liquid to be processed. Such pre-wetting of the filter media can be desirable to increase the flexibility of filter media, particularly thick filter media. Such thick filter media, which can range from 0.1 cm to 0.5 cm thickness, by way of example, which can benefit from pre-wetting is typically composed of blends of cellulose and or inorganic filter aids such as diatomite, commonly known as depth filter media. Prior filter systems commonly employ these media in flat sheet form in filter presses or in cartridges of stacked flat disks of the filter media. Those prior filter systems typically employ thick filter media in flat form because of the lack of flexibility, when the media is dry.

FIG. 1 further illustrates one practice of this optional feature of the invention with the wetting mechanism 116, typically employing a spray bar or liquid permeable hose, and illustrated as connected to operate with the control unit 52 to apply liquid to the media as it is being unrolled from the supply roll. The liquid for pre-wetting the media can be the same one that the system processes, and hence can be drawn from the storage tank 18. Excess pre-wetting liquid drains to the container 14.

In summary, filtration apparatus according to the invention has a combination of some but not necessarily all of the following features. That is, the invention provides multiple features, including the following and others, which can be employed in various combinations.

1) A low height liquid entry port 12, typically as low as 15 cm from the floor, eliminates the need for transfer pumps.

2) A small overall foot print for the filter system reduces space requirements.

3) Pneumatic control unit 52 and the pneumatic actuator 50 drive the wheel element 36 and the media conveyor belts 54, 56, to attain low cost and minimize electrical components and enhance reliability.

4) The wheel element 36 provides functions of a media conveyor and of a drive element.

5) The double acting pneumatic actuator 50 and the control unit 52 can optionally provide a time delay function between successive advances of the filter media.

6) A minimal volume of the filtered liquid chamber 34 serves several functions. The filtered liquid chamber 34 can have a small height, which in turn facilitates a small height for the liquid entry port 12. The relatively compact filtered liquid chamber 32, i.e. relatively small chamber volume, facilitates rapid pressure equalization across the media 16, rapid indexing of the media 16, prompt re-initiation of filtration after the indexing of the filter media, and increased flow rate per square foot of media. These features in turn reduce the amount of time required for a media indexing cycle.

7) An air diaphragm valve 92 (FIG. 7) to shut off the eductor motive flow simplifies integrating the control unit 52 with the differential pressure assembly and equalizing the pressure across the media 16 through the eductor discharge. The eductor discharge provides the filtered liquid chamber with an opening to atmospheric pressure.

8) Belts 54 and 56, driven with the wheel element 36, provide a simple drive for the discharge roller 64 and for transporting media through the machine. Pinch rollers 62, 62 engaged with the discharge roller 64 pinch the conveyor belts at discharge roller 64, assuring positive media discharge.

9) The ramping forward pan wall 24c, which can be contoured to form channels to drain liquid back to the reservoir 32, reduces wetted surface drag. The ramp structure contributes to effective media and contaminant discharge; it allows contaminants to dry partially as they advance through several index cycles.

10) In contrast to a centrifugal pump, the eductor 66 does not lose suction when drawing in air. The eductor 66 can intake both liquids and gases, and thus permits the use of a more compact filtered liquid chamber 32 and filter septum 28. Typical prior vacuum filters utilize a flat septum panel and require infeed and outfeed radius plates that contribute to a longer unit for a given filter area.

11) The sub-assembly of the perforated septum plate 28 and the septum supports is readily installed by seating in the pan 24, preferably with a locking engagement that maintains the septum securely in place even during advance of the filter media. The septum shape matches the contour of the wheel element 36, with which it functions.

12) The filtration apparatus includes a spring mounted wheel element 36 to provide consistent downward pressure. This downward pressure retains the septum assembly seated in the pan 24. The downward-biasing spring mounting also accommodates a wide range of filter media thickness without adjustment and permits the wheel element 36 and its transverse flight bars 36d to lift and roll over large contaminants without binding. Thus, the spring mounted wheel element 36 prevents possible overflow conditions that would otherwise occur as a result of a failure to advance the media 16 when required.

It will thus be seen that the invention efficiently attains the objects set forth above, among those made apparent from the preceding description. Since certain changes may be made in the above constructions without departing from the scope of the invention, it is intended that all matter contained in the above description and shown in the accompanying drawings be interpreted as illustrative and not in a limiting sense.

It is also to be understood that the following claims are intended to cover all generic and specific features of the invention described herein, and all statements of the scope of the invention which as a matter of language might be said to fall therebetween.

Having described the invention, what is claimed as new and secured by Letters Patent is:

1. Apparatus for separating solids from a first liquid by passing the first liquid through sheet filter media, said apparatus comprising a vessel for receiving first liquid, a chamber for receiving filtered liquid from the first liquid in the vessel under pressure assisted flow, said chamber being located at least in part below said vessel, a perforate plate separating said vessel from said chamber, said perforate plate being adapted for supporting the filter media, said perforate plate having a first end laterally spaced from a second end, an indexing mechanism for advancing the filter media along a first direction from said first end of said perforate plate to said second end of said perforate plate, a differential pressure generator for establishing a pressure differential between first liquid in said vessel and filtered liquid in said chamber and sufficient to move liquid through the filtering media into said chamber, and a control element coupled to said indexing mechanism means and said differential pressure generator for terminating the pressure differential during the advance of filter media by said indexing mechanism.

2. Apparatus according to claim 1 further comprising a media support disposed for supporting filter media during the advance thereof beyond said second end of said perforate plate to a media discharge disposed out of said first liquid.

3. Apparatus according to claim 1 in which said indexing mechanism includes a first transport for engaging filter media supported on the filter plate and moveable along the perforate plate in the direction from said first end to said second end, and an actuator for selectively moving the first transport for moving filter media along the perforate plate in the direction from said first end to said second end.

4. Apparatus according to claim 3 in which said first transport engages a first face of the filter media and said indexing mechanism includes a second transport for engaging a second opposite face of the filter media and moveable with said first transport for advancing filter media in the direction from said first end of said perforate plate to said second end thereof.

5. Apparatus according to claim 3 in which said perforate plate has a cylindrical surface adapted for supporting the filter media and said first transport includes a selectively rotatable wheel element with a circumferential surface conforming to the cylindrical surface of the perforate plate.

6. Apparatus according to claim 5 further comprising means mounting said wheel element for rotation about a generally horizontal axis, said mounting means resiliently biasing the axis vertically to a selected location and accommodating selected vertical displacement of said axis upward from that location against said bias.

7. Apparatus according to claim 5 wherein said wheel element carries a circumferentially spaced array of axially-extending members, each member arranged for engaging and advancing with filter media disposed on said perforate plate.

8. Apparatus according to claim 4 in which said second transport includes at least one endless belt having at least a portion extending along the perforate plate between said first end and said second end thereof for supportingly engaging filter media.

9. Apparatus according to claim 1 in which said indexing mechanism includes first and second transports arranged for engaging opposed surfaces of filter media and selectively moveable for advancing filter media by said engagement therewith, along said perforate plate in the direction from said first end to said second end thereof.

10. Apparatus according to claim 9 in which said first and second transports are arranged for forming a compressive nip therebetween and for engaging the opposed surfaces of the filter media in said compressive nip.

11. Apparatus according to claim 9 in which said first transport includes a wheel element having a circumferentially extending surface that engages one surface of the filter media opposite the engagement thereof with said second transport.

12. Apparatus according to claim 11 in which said second transport includes an endless belt having a belt flight disposed for engagement with a surface of the filter media opposite the engagement thereof with said wheel element.

13. Apparatus according to claim 12 further comprising a media support disposed for supporting filter media during the advance thereof beyond said second end of said perforate plate to a media discharge disposed out of said first liquid, and in which a flight of said belt of said second transport extends along said media support for engagement thereon of filter media.

14. Apparatus for separating solids from first liquid by passing the first liquid through web-like filtering media, said apparatus comprising a reservoir for receiving first liquid, a chamber for receiving filtered liquid from the first liquid in the reservoir under pressure assisted flow, said filtered liquid chamber being located at least in part below said reservoir, a perforate plate separating said reservoir from said chamber, said perforate plate being adapted for supporting the filter media and having a first end laterally spaced from a second end, a wheel element supported for rotation about a longitudinal axis, at least a portion of said wheel element being located in the reservoir, said wheel element being mounted above said perforate plate and adapted for holding filter media in place on said perforate plate and for advancing the media along a first direction from said first end of said perforate plate to said second end of said perforate plate, and an actuator coupled to said wheel element and controlling rotation of said wheel element for controlling the advance of filter media in the perforate plate.

15. Apparatus for separating solids from first liquid by passing the first liquid through web-like filter media, said apparatus comprising a vessel for receiving first liquid, a chamber for receiving filtered liquid from the first liquid in the vessel and under pressure-assisted gravitational flow, a laterally extending fluid-pervious support for filter media, said support being disposed for the flow therethrough of first liquid in said vessel to filtered liquid in said chamber, a circulating media tractor forming a media-positioning flight that passes through said vessel above said fluid-pervious support and that is structure for advancing filter media in a selected laterally-extending direction along said fluid-pervious support, an eductor communicating with said chamber for controllably introducing a selected pressure to the chamber, for establishing a pressure differential between the pressure acting on first liquid in said vessel and the pressure acting on filtered liquid in said chamber for enhancing the gravitational flow of liquid through filter media disposed on said fluid-pervious support, and a media-indexing control mechanism connected with said tractor and selective actuating said tractor for advancing filter media along said fluid-pervious support.

16. Apparatus according to claim 15 in which said media tractor forms a media-receiving flight and a media-discharge flight, both in communication with said media positioning flight, for receiving media and for transporting media to said fluid-pervious support and for further transporting media for discharge.

17. Apparatus according to claim 16 in which said media tractor includes a rotatable wheel element and an endless belt, said wheel element and said belt being arranged for forming therebetween a compressive nip for engagement with opposed surfaces of the filter media.

18. Apparatus according to claim 15 in which said vessel is disposed for receiving by gravity first liquid discharged from a machine, in which at least a portion of said chamber is disposed below said vessel, and in which said fluid- pervious support is disposed with first liquid in said vessel above it and with filtered liquid in said chamber below it.

19. Apparatus for separating solids from first liquid by passing the first liquid through sheet filter media, said apparatus comprising vessel means for receiving first liquid, chamber means for receiving filtered liquid from the first liquid in the vessel means, under pressure-assisted flow, laterally-extending fluid-pervious media-supporting means disposed for the flow therethrough of first liquid in said vessel means to filtered liquid in said chamber means, liquid level sensing means responding to the level of liquid in said vessel means, circulating media tractor means forming a media positioning flight that extends within said vessel means above said support means, and structured for advancing filter media, in cooperation with said sensing means, in a selected laterally-extending direction along said support means, and pressure generating means communicating with at least one of said vessel means and said chamber means for controllably introducing a selected pressure differential between the pressure acting on first liquid in said vessel means and the pressure acting on filtered liquid in said chamber means for assisting the flow of liquid through filter media disposed on said support means.

20. Apparatus according to claim 19 further comprising indexing means connected with said tractor means and selectively actuating said tractor means for advancing filter media along said support means.

21. A method for separating solids from first liquid by passing the first liquid through web-like filter media, said method comprising the successive steps of containing first liquid in a containment vessel, receiving in a chamber filtered liquid from the first liquid in the vessel, under pressure-assisted flow, filtering liquid flowing between said containment vessel and said chamber with filter media supported on a laterally-extending, fluid-pervious support disposed for flow therethrough of first liquid in said vessel to filtered liquid in said chamber, sensing liquid level in said vessel, and advancing filter media, in response to said sensing of liquid level, along said support incrementally in a selected laterally-extending direction along said fluid-pervious support.

22. A method according to claim 21 further comprising the steps of maintaining substantially atmospheric pressure in said containment vessel, and selectively establishing a sub-atmospheric pressure in said chamber for establishing a selected pressure differential between the pressure acting on the first liquid in said vessel and the pressure acting on filtered liquid in said chamber for enhancing the flow of liquid through said filter media disposed on said fluid-pervious support.

* * * * *